United States Patent

[11] 3,570,364

[72] Inventor Joseph G. Thibodaux, Jr.
 1406 Antigua, Houston, Tex. 77058
[21] Appl. No. 467,820
[22] Filed June 22, 1965
 Division of Ser. No. 151,110, Nov. 8, 1961,
 Pat. No. 3,421,325, which is a continuation-in-part of Ser. No. 8,200, Feb. 11, 1960, abandoned.
[45] Patented Mar. 16, 1971

[54] METHOD OF MAKING A SOLID PROPELLANT ROCKET MOTOR
 5 Claims, 3 Drawing Figs.
[52] U.S. Cl. ..................................... 86/1,
 86/20.2, 102/101, 264/3
[51] Int. Cl. ..................................... F42b 17/00,
 F42b 9/14, C06b 21/02
[50] Field of Search ........................... 86/1, 20.2,
 20.5; 102/98; 264/3; 102/101

[56] References Cited
UNITED STATES PATENTS

| | | | |
|---|---|---|---|
| 3,001,363 | 9/1961 | Thibodaux et al. | 86/20.5x |
| 3,193,883 | 7/1965 | Thibodaux et al. | 102/98x |
| 3,196,735 | 7/1965 | Baldwin | 102/98x |

Primary Examiner—Samuel W. Engle
Assistant Examiner—Jerald J. Devitt
Attorneys—G. T. McCoy and Howard J. Osborn CLAIM: 1. A method of making a solid propellant rocket motor having reliable high-altitude capabilities, long shelf life and capable of being fired without the use of a nozzle closure comprising the steps of:

providing a hollow, substantially cylindrical rocket motor casing center section;

positioning and securing a first hemispheroidal casing section along abutting edges of said center section at one end thereof;

positioning this partially assembled motor casing with its longitudinal axis vertically disposed with said hemispheroidal section in a lowermost position;

inserting a combustible mandrel having electroresponsive igniter means thereon in electrical contact with elongated lead wires extending therefrom within the partially assembled casing;

positioning and securing a second hemispheroidal casing along abutting edges of said center section about said mandrel, said second hemispheroidal casing being provided with a central aperture therein and having an annular overlying plate secured about the aperture, said annular plate including an integral rearwardly directed externally threaded annular projection;

suspending said mandrel by said lead wires to space said mandrel from the interior casing wall and provide a propellant receiving cavity therein;

pouring a liquefied curable propellant through said annular projection to completely fill said cavity about said mandrel;

maintaining the propellant filled casing at a predetermined temperature for a predetermined length of time to cure said propellant to thereby seal said mandrel therein and to seal said central aperture;

trimming away any excess propellant extending beyond said annular projection after curing;

and threadingly securing an internally threaded nozzle to said externally threaded projection with said elongated lead wires extending therethrough.

Patented March 16, 1971 3,570,364

INVENTOR
JOSEPH G. THIBODAUX, JR.

BY
ATTORNEYS

METHOD OF MAKING A SOLID PROPELLANT ROCKET MOTOR

This application is a division of my copending application Ser. No. 151,110, now U.S. Pat. No. 3,421,325, issued Jan. 14, 1969, filed Nov. 8, 1961, as a continuation-in-part of application for U.S. Pat. Ser. No. 8,200, filed Feb. 11, 1960, now abandoned.

This invention relates generally to a rocket motor, and more particularly to a solid propellant rocket motor.

The invention described herein may be manufactured and used by or for the Government of the United States of America for governmental purposes without the payment of any royalties thereon or therefore.

Heretofore, one type of prior art solid fuel rocket motor has been produced by completely filling a motor casing with a solid propellant. The propellant adjacent the nozzle opening is ignited, and the propellant burns forwardly along a single plane. Subsequently, it was determined that the thrust developed by such a motor would be increased by enlarging the burning area of the propellant. Accordingly, an improved type of prior art motor included a concavity formed centrally in the propellant charge to provide a larger burning surface. Several methods of forming this internal concavity have been proposed. One such method involves precasting the solid propellant into quadrants which, when positioned within the motor casing, form a solid charge having an internal concavity collinear with the motor nozzle. Another such proposed method involves precasting the propellant in rectangular bars, which are placed around the inner surface of the motor casing to form an annular propellant charge. These prior art solid fuel motors and the methods for producing the same were not considered entirely satisfactory, however, due to the multiplicity of steps necessary to form the propellant charge and position it within the motor casing. Another prior art method of producing solid fuel motors involves placing a cavity forming mandrel within a motor casing, casting a propellant around the mandrel, and then removing the mandrel from the motor. In removing the mandrel, however, the propellant charges quite often are broken or displaced in the casing; forming cracks in the propellant within which some combustion takes place upon motor ignition. These cracks cause the motor to exhibit uneven linear thrust when fired. Moreover, the size of the cavity formed in the charge is, of necessity, limited by the size of the nozzle opening in the motor casing through which the mandrel is extracted. It will be apparent, therefor, that prior art methods of making solid propellant rocket motors leave much to be desired, due to the relatively large number of operational steps needed to produce the motors. Furthermore, the motors produced by such prior art methods are generally of poor quality with limited shelf life and are characterized by unreliability of performance.

Accordingly, it is an object of the present invention to provide a new and improved method of making solid propellant rocket motors.

Another object of the instant invention is a method providing a new and improved contoured charge ignition cavity for a solid fuel rocket motor.

A further object of the present invention is to provide a new and improved solid fuel rocket motor capable of being fired with a charge contouring mandrel in place within the motor.

A still further object of the instant invention is a method of making a new and improved solid fuel rocket motor having a longer shelf life.

Another still further object of the invention is to provide a new and improved solid fuel rocket motor having reliable high altitude ignition capabilities.

Still another object of the present invention is to provide a new and improved solid propellant rocket motor capable of establishing an equilibrium operating condition in a vacuum.

Still a further object of the invention is to provide a new and improved solid fuel rocket motor capable of being fired without a nozzle closure.

Generally speaking, the foregoing and other objects are accomplished in accordance with this invention by the provision of a solid propellant rocket motor having a rigid foamed plastic mandrel permanently positioned axially within the motor propellant, and electroresponsive ignition means positioned within the mandrel.

A more complete understanding of the invention and many of the attendant advantages thereof will be readily appreciated as the same becomes better understood by reference to the following detailed description when considered in connection with the accompanying drawing wherein.

Figure 1:
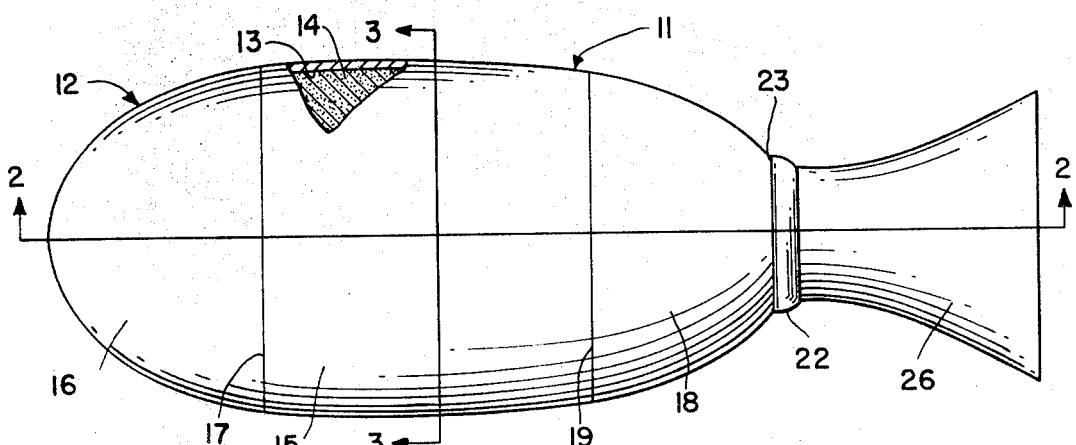
FIG. 1 is a plan view of the rocket motor made by the present invention, with parts broken away to show the internal shell structure.
Figure 2:
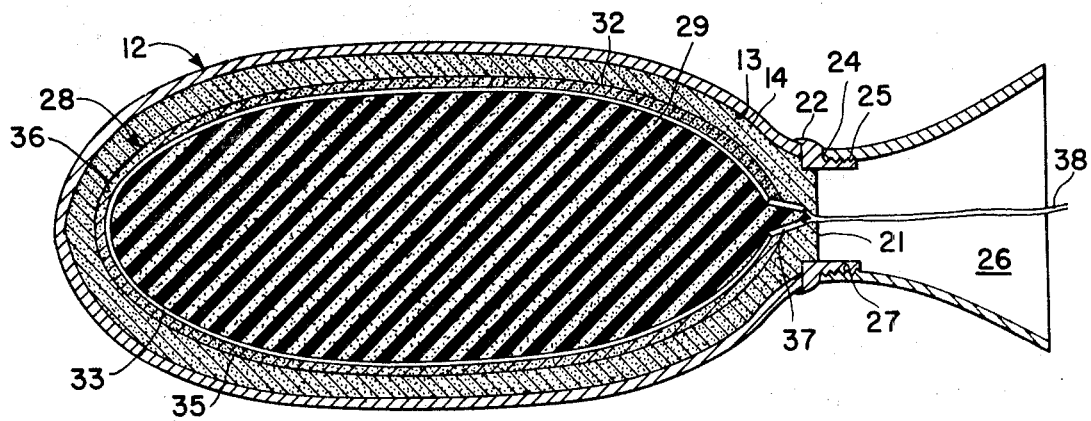
FIG. 2 is an elevational cross-sectional view of the rocket motor taken along line 2—2 of FIG. 1.

Referring now to the drawing, wherein like reference numerals designate identical or corresponding parts throughout the several views, and more particularly to FIG. 1, the rocket motor, generally indicated by the reference numeral 11, is shown provided with a motor casing 12 having a concavity 13 defined by the inner surface of casing 12 and containing a solid propellant 14. Casing member 12 includes a substantially cylindrical center section 15 having one end securely attached to a hemispheroidal front section 16 along the abutting edges thereof by a weld 17. A hemispheroidal rear section 18 is likewise affixed to center section 15 at the other end thereof by a weld 19 along the abutting edges of the adjoining members. Motor casing 12 preferably is formed of SAE 4130 steel having a thickness of approximately one-sixteenth to one twenty-fifth of an inch. As shown in FIG. 2, rear section 18 is provided with an aperture or bore 21 formed centrally therein, and an annular overlying plate 22 firmly secured around aperture 21 to rear section 18 in any conventional manner, such for example, as by a weld 23. Annular plate 22 includes an integral rearwardly directed annular projection 24 of reduced diameter having external screw threads 25. A frustroconical nozzle element 26 having an internally threaded smaller forward end portion 27 is connected to rear motor casing section 18 by engagement with projection 24.

Figure 3:
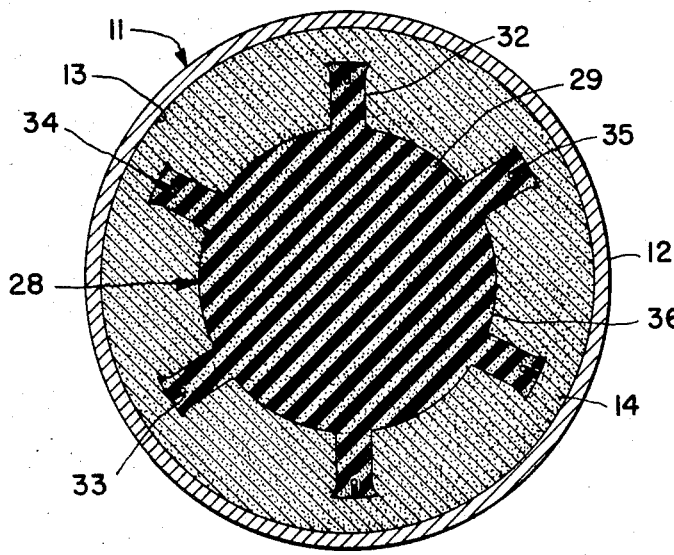
FIG. 3 is a cross-sectional view of the rocket motor taken along line 3—3 of FIG. 1.

A mandrel, generally designated by the reference numeral 28, is axially disposed in propellant 14 within motor casing 12, as shown in FIG. 3. Mandrel 28 has a prolate spheroidal shaped center body member 29 preferably having a forward portion and an after portion conforming in shape to the forward and after portions, respectively, of concavity 13. Body member 29 is provided with equidistantly radially spaced essentially T-shaped projections 32 extending along the entire length of mandrel 28, which terminate short of the inner surface of casing 12 so that a layer of propellant 14 lines the interior surface of casing 12. It will be noted, as more fully set forth hereinafter, that the maximum diameter of mandrel 28 exceeds the diameter of motor casing aperture 21 to provide a larger propellant burning surface. The propellant lining between casing 12 and projections 32 further provides heat protection for the wall structure of casing 12 until propellant combustion is near termination. A string igniter 33 such, for example, as Pyrocore or the equivalent, is positioned centrally and longitudinally within each projection 32 in a slit or groove 34 (FIG. 3) extending along the entire length of each of the projections 32. A seam filler 35 of an ignitable mixture consisting of boron potassium nitrate and a binder such, for example, as Vistanex or the like, is placed within slit 34 above the string igniter 33 and extending to the exterior surface of mandrel 28. A thin layer 36 (FIG. 2) of the ignitable mixture also preferably covers the entire exterior surface of mandrel 28.

A mild electroresponsive end primer 37 is connected to the terminal end portion of each string igniter 33, as shown in FIG. 2. Primer 37 is connected to leads 38 which extend through aperture 21 to the exterior of motor 11 and which in turn are connected to an exterior source of electrical energy, not shown.

Mandrel 28 is preferably formed by foaming a chemical reaction mixture capable of producing a rigid cellular plastic foam having a density of approximately 2 to 3 pounds per cubic foot in a mold. One such suitable reaction mixture is a reactable mixture of a polyester and a polyisocyanate which is poured into a mold having the desired mandrel configuration and foamed therein. The foaming reaction and molding are carried out by conventional methods. After completion of the foaming reaction, the foamed mandrel 28 is removed from the mold. Each radial projection 32 is then split lengthwise and centrally to the center thereof with a foam cutting tool such, for example, as a knife or a heated wire. A string igniter 33 is placed in each projection slit 34 and extends completely around mandrel 28. An ignitable slurry of about 95 percent boron potassium nitrate and about 5 percent of a binder such, for example, as Vistanex, or the equivalent, is placed in a carrier such as hexane and poured into slit 34. The hexane evaporates readily leaving a seam filler 35 (FIG. 3) of the ignitable material extending from string igniter 33 to the exterior or surface of mandrel 28. A thin layer 36 of the ignitable slurry is also applied to the exterior surface of mandrel 28 by brushing or spraying.

METHOD OF MAKING

In manufacturing the rocket motor of the present invention, the motor casing 12 may initially be partially assembled by connecting center section 15 to forward section 16 along the abutting edges thereof by weld 17. The partially assembled motor casing may then be positioned with its longitudinal axis vertically disposed and forward section 16 in the lowermost position. Mandrel 28 may next be placed in the motor casing, and rear section 18 brought into peripheral contact with center section 15. The electrical leads 38 which are interconnected with mandrel 28 are passed upwardly through aperture 21 of rear section 18, and may be utilized to suspend mandrel 28 within concavity 13 of casing 12 with the parts of mandrel 28 spaced inwardly of the interior wall of motor casing 12 in operative position as illustrated in FIGS. 2 and 3 of the drawing. The motor casing center section 15 and rear section 18 may then be connected together by weld 19, which may be accomplished, for example, by the conventional argon arc welding process; the spacing between motor casing 12 and mandrel 18 being sufficient to prevent ignition of mandrel 28 by heat developed in motor casing 12 by the welding operation. The cavity formed in motor casing 12 between mandrel 28 and the interior wall of the casing is then filled by pouring through aperture 21 a liquid polysulfide perchlorate propellant 14 such, for example, as Thiokol T-21 or the equivalent; care being exercised in casting the propellant against displacement of mandrel 28 within the motor casing. Upon completion of the propellant casting operation, the propellant is solidified and cured by maintaining the filled motor casing at a temperature of approximately 140° F. for about 4 hours in an oven or similar heating device. After curing, the charge is trimmed, if necessary, and nozzle 26 is threadedly connected to casing 12. In operation of the motor, electrical energy supplied from an external source passes through leads 38 and ignites the electroresponsive primer 37. Primer 37, after ignition, initiates a chain reaction by igniting string igniters 33 which, in turn, ignite seam filler 35 and layer 36 of the ignitable mandrel material. During the chain reaction the foam mandrel 28 is destroyed by combustion, exposing the surface of propellant 14, which is simultaneously ignited, thereby activating motor 11.

Since propellant 14 is sealed within motor casing 12 from the outside atmosphere by the permanently positioned mandrel 28, oxidation of the propellant by the atmosphere is substantially reduced thereby improving the shelf life of the rocket motor. In addition, mandrel 28 allows the motor to be fired without a nozzle closure, and provides for a more reliable high altitude ignition, as there is no loss of gases under near vacuum conditions at high altitudes. Permanent mandrel 28 also provides the necessary inertia to allow buildup of gas pressure required to establish an equilibrium operating condition under vacuum.

Moreover, mandrel 28 can form any desired concavity shape within the solid fuel charge, as the diameter of mandrel 28 is no longer limited by the diameter of aperture 21 since mandrel 28 does not have to be removed from the motor through this opening.

Obviously numerous modifications and variations of the present invention are possible in the light of the above teachings. It is therefore to be understood that within the scope of the appended claims the invention may be practiced otherwise than as specifically described.

I claim:

1. A method of making a solid propellant rocket motor having reliable high-altitude capabilities, long shelf life and capable of being fired without the use of a nozzle closure comprising the steps of:
    providing a hollow, substantially cylindrical rocket motor casing center section;
    positioning and securing a first hemispheroidal casing section along abutting edges of said center section at one end thereof;
    positioning this partially assembled motor casing with its longitudinal axis vertically disposed with said hemispheroidal section in a lowermost position;
    inserting a combustible mandrel having electroresponsive igniter in electrical contact with elongated lead wires extending therefrom within the partially assembled casing;
    positioning and securing a second hemispheroidal casing along abutting edges of said center section about said mandrel, said second hemispheroidal casing being provided with a central aperture therein and having an annular overlying plate secured about the aperture, said annular plate including an integral rearwardly directed externally threaded annular projection;
    suspending said mandrel by said lead wires to space said mandrel from the interior casing wall and provide a propellant receiving cavity therein;
    pouring a liquefied curable propellant through said annular projection to completely fill said cavity about said mandrel;
    maintaining the propellant filled casing at a predetermined temperature for a predetermined length of time to cure said propellant to thereby seal said mandrel therein and to seal said central aperture;
    trimming away any excess propellant extending beyond said annular projection after curing; and
    and threadingly securing an internally threaded nozzle to said externally threaded projection with said elongated lead wires extending therethrough.

2. The method of claim 1 and further including: said combustible mandrel being a foamed material formed by molding a reactable mixture of a polyester and a polyisocyanate to the desired mandrel configuration.

3. The method of claim 1 including the steps of: forming elongated cavities along selected portions of said combustible mandrel, inserting ignition means within said elongated cavities and in contact with said electroresponsive igniter means prior to insertion of said combustible mandrel within the partially assembled casing.

4. The method of claim 3 wherein said elongated cavities are formed by employing a heated instrument to partially sever said combustible mandrel at the selected portions.

5. A method of making a solid propellant rocket motor having reliable high-altitude capabilities, long shelf life and capable of being fired without the use of a nozzle closure comprising the steps of:
    providing a hollow, substantially cylindrical rocket motor casing center section;
    positioning and securing a first hemispheroidal casing section along abutting edges of said center section at one end thereof;

positioning this partially assembled motor casing with its longitudinal axis vertically disposed with said hemispheroidal section in a lowermost position;

inserting a combustible mandrel having integrally attached ignition means thereon and attached electrical lead wires within the partially assembled casing;

positioning and securing a second hemispheroidal casing along abutting edges of said center section about said mandrel, said second hemispheroidal casing being provided with a reduced diameter central aperture therein for receiving a rocket nozzle;

suspending said mandrel by attached electrical lead wires to space said mandrel from the interior casing wall and provide a propellant receiving cavity therein;

pouring a liquefied curable propellant through said annular projection to completely fill said cavity about said mandrel;

curing said propellant; and attaching a nozzle to the reduced diameter central aperture of said second hemispheroidal casing.